United States Patent Office 2,901,920
Patented Sept. 1, 1959

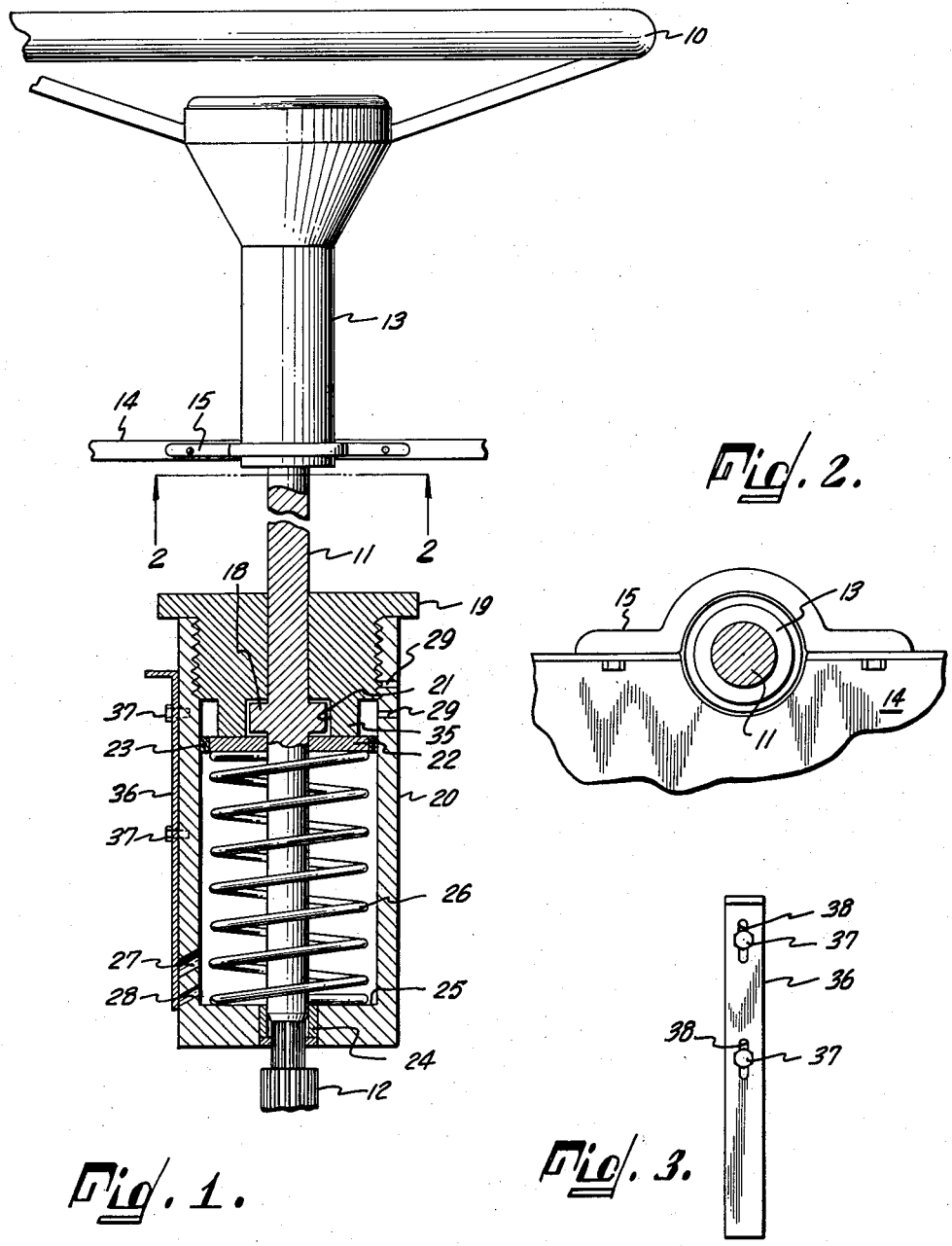

2,901,920

DEPRESSIBLE STEERING CONSTRUCTION FOR AUTOMOTIVE VEHICLES

Basil B. Felts, Banning, Calif.

Application October 28, 1957, Serial No. 692,900

8 Claims. (Cl. 74—493)

This invention relates to a depressible steering construction for automotive vehicles.

It is a well-known fact that large numbers of persons are killed or seriously injured due to impact with the steering wheel and steering assembly of an automotive vehicle upon the occurrence of a collison. It is an object of this invention to provide a depressible steering construction for automotive vehicles which is adapted to automatically yield beneath the impact of the driver's body in the event of a collision. It is a further object of the invention to provide such a structure in which its yieldability does not interfere in any way with the operation and driving control of the steering assembly.

It is another object of the invention to provide a device of the type described which is simple in construction and design, requiring only a limited number of easily manufactured and assembled parts, so that it is capable of widespread use by manufacturers and the general public. It is a related object of the invention to provide such a structure which may be installed as original equipment at the time an automotive vehicle is manufactured or which may be easily, quickly and economically installed on any new automotive vehicle.

It is a further object of the invention to provide such a device in which the steering column passes through the longitudinal axis of a coil spring. The column thus prevents dislocation or binding of the spring and assures its proper operation and orientation at all times. The construction is further so designed that the steering wheel and column are completely free from any pressure or binding from the spring.

The depressible steering construction of my invention contemplates a housing having an integral shoulder for receiving the lower end of a coil spring. The steering column extends longitudinally through the axis of the coil spring and housing. The top of the housing, through which the steering column enters, is provided with an adjustable bushing. The bushing engages and surrounds a flange on the steering column. The upper end of the coil spring bears against a ring which fits against the lower end of the bushing, leaving the steering column free from pressure from the coil spring.

The ring frictionally engages the interior surface of the housing, providing an air-tight seal. An air outlet adjacent the bottom of the housing is normally held closed by a slide member. When extreme pressure is exerted upon the steering wheel, the ring is forced downwardly in the housing against the pressure of the coil spring and against the pressure of the air beneath the ring, which is forced out through the air outlet.

The slide member has a resilient lower end which normally covers the air outlet and which is forced away from the housing to permit air to escape from the housing. The slide member is adapted to be moved upwardly to expose an air inlet which is disposed beneath the air outlet to permit air to re-enter the housing to return the steering wheel to its normal position.

It is accordingly an object of my invention to provide a device having all of the features and advantages of the construction set forth.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings,

Fig. 1 is an elevational view of my depressible steering construction, with the portion beneath the dashboard shown mostly in section;

Fig. 2 is a sectional view taken on line 2—2 of Fig. 1;

Fig. 3 is a side elevational view of the slide member.

A preferred embodiment which has been selected to illustrate my invention comprises a steering wheel 10, which is preferably formed of conventional substantially rigid materials. Collapsibility of the steering wheel per se is believed to be undesirable, since it necessarily interferes with the function and steering control of the wheel, whereas my device remains completely operable at all times.

A steering column 11 is attached at its upper end to the steering wheel 10 and at its lower end to a receiver 12 by splines, the receiver in turn being connected to the gear box.

Surrounding the upper part of the steering column 11 is a steering column housing 13, which extends through the dashboard 14 of the vehicle. The steering column housing 13 does not turn with the steering wheel 10. The lower end of the steering column housing 13 is disposed beneath the dashboard 14.

The steering column housing 13 may, if desired, be attached to the dashboard by a mounting member 15, which has two flat ends, which are attached to the dashboard 14 by suitable fastening means, and a semicircular center portion which surrounds the steering column housing 13.

A transmission shifting lever may be provided adjacent the steering wheel 10 or elsewhere, as desired. A turn signal indicator may also be mounted on the steering column housing 12. The electric wires from the horn and turn signal indicator pass downwardly through the steering column housing 13.

The steering column 11 is provided with an outwardly directed substantially circular flange 18 adjacent the midportion thereof. The portion of the steering column 11 directly above the flange 18 extends through an adjustable bushing 19 into an elongated cylindrical housing 20. The bushing 19 has exterior screw threading which fits into a screw threaded opening in the top of the housing 20.

The lower end of the bushing 19 is provided with a downwardly directed collar 35, the outer diameter of which is smaller than that of the remainder of the bushing 19. The collar 35 is provided with a central recess 21, the inner diameter of which is slightly larger than that of the flange 18 and the depth of which slightly exceeds the thickness of the flange 18. A circular ring 22 fits against the lower end of the collar 35.

The ring 22 fits closely against the steering column 11 and is provided with a circular gasket 23 which extends around its periphery and which forms a substantially airtight seal against the inner wall of the housing 20.

Referring to Fig. 1 of the drawings, the clearances between the parts have been somewhat exaggerated in this figure in order to show that the flange 18 of the steering column 11 fits within the recess 21 and is surrounded by the bushing 19 and its collar 35.

The housing 20 has a bearing 24 in the lower part thereof, in which the lower end of the steering column 11 is journaled. The bearing 24 is also gasketed, if necessary, so that it is substantially airtight.

The housing 20 is provided with an inwardly directed shoulder 25. A coil spring 26 is mounted within the hollow portion 23 of housing 20, surrounding the steering column 11, with its lower end bearing against the top of the shoulder 25 and its upper end bearing against the ring 22. The bushing 19 is preferably provided with a Zerk fitting or other means through which lubrication can pass.

The portion of the steering column 11 within the lower part of the housing 20 is provided with splines which slidably fit into a complementary spline receiving portion of the receiver 12. Other suitable slidable connecting means may also be provided.

The lower end of the housing 20 is provided with a large angularly directed air outlet 27 and a smaller angularly directed air inlet 28, which is disposed therebeneath. A slide 36 is attached to the side of the housing 20 by a pair of screws 37. The screws 37 have shanks which pass through slots 38 in the slide 36, the length of the slots 38 being such as to permit vertical movement of the slide 36 to expose the air inlet 28 without exposing the air outlet 27. The lower end of the slide 36 is free from attachment to the housing 20 and is formed of substantially resilient material so that it is free to flex away from the housing 20 to permit air to pass outwardly quickly from the housing 20 through the air outlet 27. The upper end of the housing 20 may be provided with one or more air inlets 29, if necessary.

In operation, the steering assembly functions in the conventional manner until a collision occurs. In such event, the impact from the driver's body and the collision cause the steering wheel 10 to move away from the driver. This movement is permitted by downward movement of the steering column 11 against the pressure of the coil spring 26, with the splines moving along the spline receiving portions of the receiver 12. The coil spring 26 thus absorbs the impact in a resilient manner.

As the steering column 11 moves downwardly, the ring 22 is moved downwardly within the housing 20, causing the air between the ring 22 and the bottom of the housing 20 to be compressed. The pressure of the air within the housing 20 forces air out through the air outlet 27 by causing the resilient lower end of the slide 36 to flex outwardly.

When the ring 22 reaches the bottom of the housing 20, further downward movement of the steering wheel will be prevented. It should be noted, however, that the steering wheel can still be rotated to operate the steering mechanism even while the steering wheel is in a depressed position.

The pressure of the coil spring 26 will tend to return the steering wheel to its normal position, but will be resisted by the substantial vacuum created within the housing 20 between the ring 22 and the bottom of the housing. The return movement of the steering wheel will thus normally be accomplished slowly, due to the seepage of small amounts of air into the housing 20. If a faster return movement of the steering wheel is desired, the slide 36 can be moved upwardly manually to open the air inlet 28 and permit air to enter the housing 20.

With regard to the coil spring 26, it will be noted that the flange 18 is completely free from any pressure from the coil spring 26, being protected by the collar 35 of bushing 19. There is accordingly no interference with the operation of the steering wheel 10 and steering column 11.

The size, length and strength of the coil spring 26 can be varied as desired. In this connection, the adjustable bushing 19 can be adjusted as desired either for the purpose of lengthening or shortening the steering wheel 10 or to change the spring pressure.

I claim:
1. In a depressible steering construction which includes a steering column slidably extending through a housing and a coil spring surrounding said steering colum within said housing, a ring mounted for downward movement within said housing upon the downward movement of said steering column, the upper end of said coil spring bearing against said ring, said ring having a gasket extending around its periphery, said gasket forming a substantially airtight seal with the inner wall of said housing, an air outlet extending through the wall of said housing adjacent the lower end thereof, closure means having a resilient portion normally disposed in sealing relationship overlying said air outlet, said steering column adapted upon downward force being exerted thereon to move downwardly against the pressure of said coil spring, causing said ring to move downwardly within said housing, said resilient portion of said closure means adapted to be flexed outwardly from said housing to permit air to pass from said housing through said air outlet when said ring is moved downwardly within said housing, said resilient portion being adapted to flex back to closing position when said ring has completed its downward movement, the area between said ring and the bottom of said housing being substantially airtight to form a substantial vacuum which resists the tendency of said coil spring to return said steering wheel to its normal position.

2. The structure described in claim 1 and an air inlet extending through said housing and disposed adjacent the lower end of said housing, said closure means normally closing said air inlet and being manually operable to open said air inlet to permit air to enter said housing beneath said ring to permit faster return movement of said steering wheel.

3. The structure described in claim 1 and an air inlet extending through said housing and disposed beneath said air outlet, said closure means comprising a slide member slidably mounted on the outside of said housing, said slide member having a resilient lower portion normally overlying said air outlet and air inlet, said slide member adapted to be manually moved upwardly to open said air inlet.

4. In a depressible steering construction which includes a steering column slidably extending through a housing and a coil spring surrounding said steering column within said housing, a ring mounted for downward movement within said housing upon the downward movement of said steering column, the upper end of said spring bearing against said ring, said ring forming a substantially airtight seal with the inner wall of said housing, an air outlet disposed adjacent the lower end of said housing, and means permitting air to pass out of said housing through said air outlet when said ring is moved downwardly within said housing, said means preventing air from passing through said housing through said air outlet, whereby a substantial vacuum is formed within said housing which resists the tendency of said coil spring to move said ring and steering wheel upwardly.

5. The structure described in claim 4, and means manually operable to permit air to enter said housing to facilitate the return movement of said steering wheel to normal position.

6. A depressible steering construction for automotive vehicles comprising a steering wheel mounted on the upper end of a steering column, a housing, said steering column rotatably and slidably extending through said housing, a coil spring surrounding said steering column within said housing, a ring surrounding said steering column and mounted for downward movement within said housing upon the downward movement of said steering column, said ring having a gasket extending around its periphery, said gasket forming a substantially airtight seal with the inner wall of said housing, an air outlet extending through the wall of said housing adjacent the lower end thereof, a closure having a resilient portion normally disposed in sealing relationship overlying said air outlet, said steering column adapted upon downward force being exerted thereon to move downwardly against the pressure of said coil spring, causing said spring to move downwardly within said housing, said resilient portion being adapted to be flexed outwardly from said housing to permit air to pass from said housing through said air outlet when said ring is moved downwardly within said housing, said resilient portion being adapted to flex back to closing position when said ring has completed its downward movement, the area between said ring and the bottom of said housing being substantially airtight to form a substantial vacuum which resists the tendency of said coil spring to return said steering wheel to its normal position.

7. The structure described in claim 6 and an air inlet extending through said housing and disposed adjacent the lower end of said housing, said closure normally closing said air inlet, said closure being manually operable to open said air inlet to permit air to enter said housing beneath said ring to permit faster return movement of said steering wheel.

8. The structure described in claim 6 and an air inlet extending through said housing and disposed beneath said air outlet, said closure comprising a slide member slidably mounted on the outside of said housing, said slide member having a resilient lower portion normally overlying said air outlet and air inlet, said slide member adapted to be manually moved upwardly to open said air inlet.

References Cited in the file of this patent
UNITED STATES PATENTS

| | | |
|---|---|---|
| 37,701 | Nudd | Feb. 17, 1863 |
| 1,066,150 | Reitz | July 1, 1913 |
| 2,227,821 | Burrell | Jan. 7, 1941 |
| 2,511,165 | Lyman | Jan. 13, 1950 |
| 2,777,462 | Hohnstein | Jan. 15, 1957 |
| 2,779,208 | Pittman et al. | Jan. 29, 1957 |
| 2,785,837 | Smith | Mar. 19, 1957 |
| 2,815,676 | Felts et al. | Dec. 10, 1957 |
| 2,815,677 | Felts et al. | Dec. 10, 1957 |
| 2,828,646 | Farmer | Apr. 1, 1958 |